Patented Oct. 29, 1929

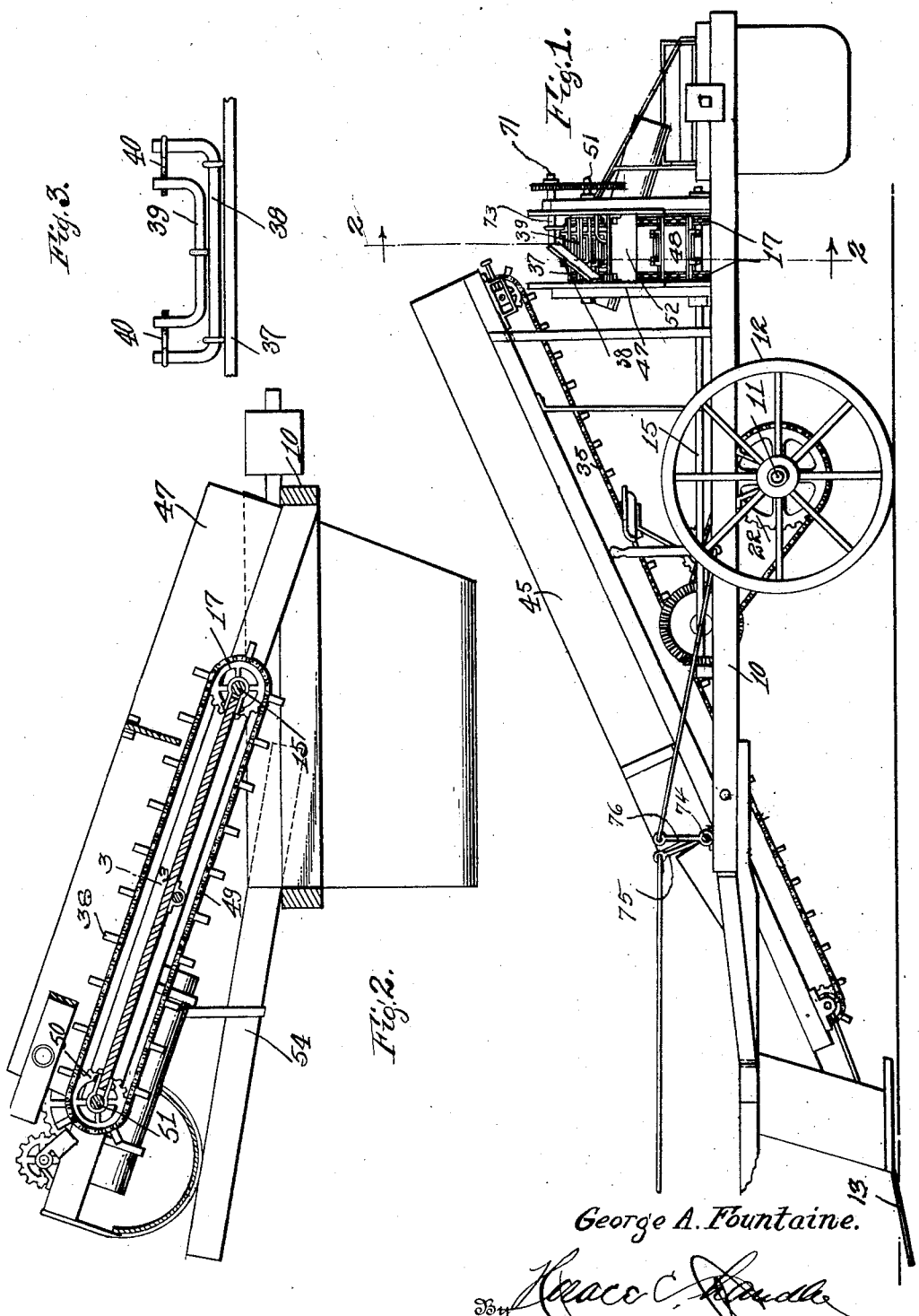

1,733,533

UNITED STATES PATENT OFFICE

GEORGE A. FOUNTAINE, OF DETROIT, MICHIGAN

BEET HARVESTER

Application filed February 27, 1924. Serial No. 695,470.

This invention relates to new and useful improvements in harvesting machines, and particularly to machines for harvesting root crops such as beets, potatoes, carrots, chicory, and the like.

One object of the invention is to provide a device of this character which is simple in construction, durable and efficient in use, and which can be manufactured at a comparatively low cost.

Other objects and advantages will be apparent from the following description when taken in connection with the accompanying drawings.

In the drawings:

Figure 1 is a side elevation of a harvesting machine made in accordance with the present invention.

Figure 2 is an enlarged section on the line 2—2 of Figure 1.

Figure 3 is a sectional view on line 3—3 of Figure 2.

Referring particularly to the accompanying drawing, 10 represents a frame which is supported by the wheels 12, mounted on the axle 11. Supported on the forward end of the frame 10 is a digger 13, which lifts the beets up to the conveyor belt 35, mounted in the inclined chute 45, which is carried by said frame. Disposed transversely of the rear end of the frame 10 is an upwardly and laterally inclined chute 47, in which is mounted the endless conveyor which includes the apron 48 mounted on the chains 49, said chains being driven by the sprockets 50 on the shaft 51, at the upper end of the chute, and the sprockets 17, on the shaft 15, at the lower end of the chute. It will be noted that the chute 47 is mounted in position to receive material from the upper end of the conveyor 35, of the chute 45. As clearly seen in Figure 3, bars 37 extend between the chains 49, and are secured thereto, whereby to properly maintain the chains in spaced relation. Secured to each of the bars 37, intermediate the ends thereof, is a substantially U-shaped member 38, the arms of which are directed outwardly at right angles to the plane of the apron. Secured to each of the members 38 is a smaller U-shaped member 39, the arms of which are directed similarly to those of the member 38, and carried by each arm of the member 39 is an outwardly extending eyebolt 40, the eye of which engages on an arm of the member 38, as clearly seen in Figure 3.

The larger members 38 are adapted to engage and carry the larger roots, such as beets, potatoes, and the like, while the smaller members 39 serve to elevate the smaller roots, such as carrots, chicory, and the like.

What is claimed is:

1. A conveyor for a beet harvester comprising a belt, transverse bars on the belt, U-shaped members secured to the bars with their arms extending away from the belt, a second U-shaped member secured to each of the first members with the arms thereof between and parallel with the arms of the first U-shaped member, and means connecting each arm of an inner U-shaped member with the corresponding arm of an outer U-shaped member.

2. A flight for a conveyor comprising a pair of U-shaped members one of which is smaller than the other and disposed between the arms of the other member, a terminally apertured member carried by each arm of the smaller U-shaped member and receiving the corresponding arm of the larger U-shaped member.

In testimony whereof, I affix my signature.

GEORGE A. FOUNTAINE.